Nov. 3, 1936.                W. W. McBANE                2,059,703
                         COIL HANDLING APPARATUS
                          Filed Feb. 9, 1933            5 Sheets-Sheet 1
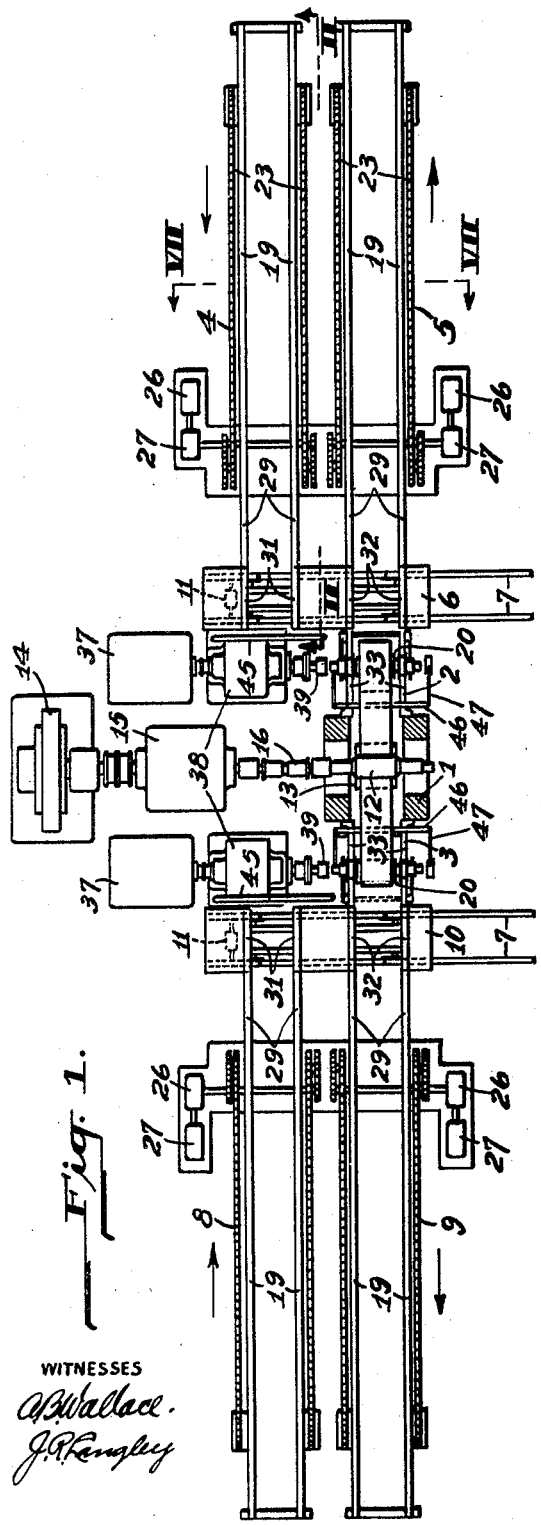
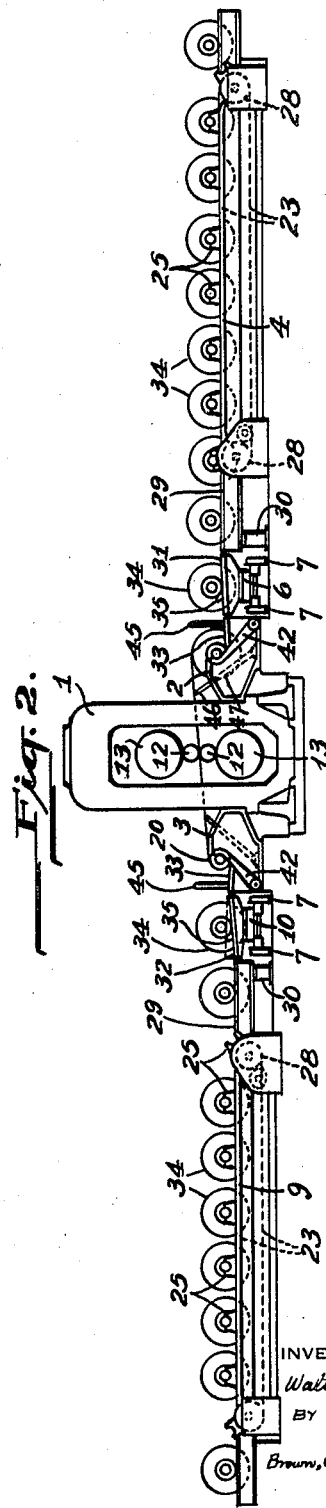
WITNESSES
                                                        INVENTOR
                                                        Walter W. McBane
                                                        BY
                                                        Brown, Critchlow & Flick
                                                        Attorneys

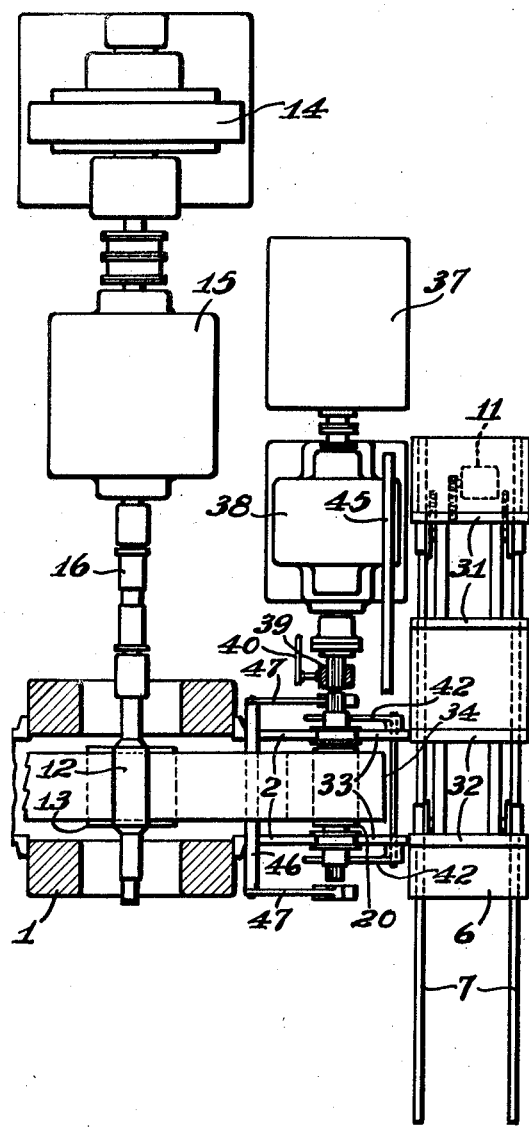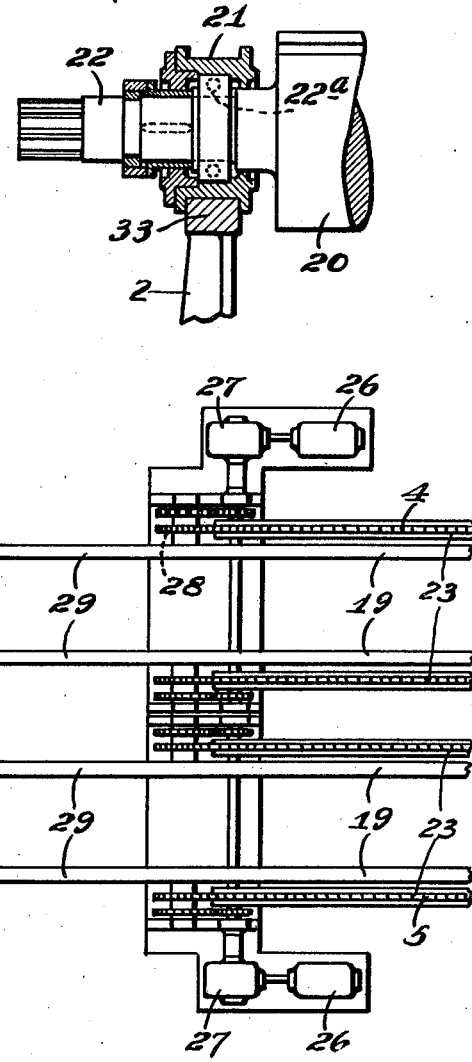

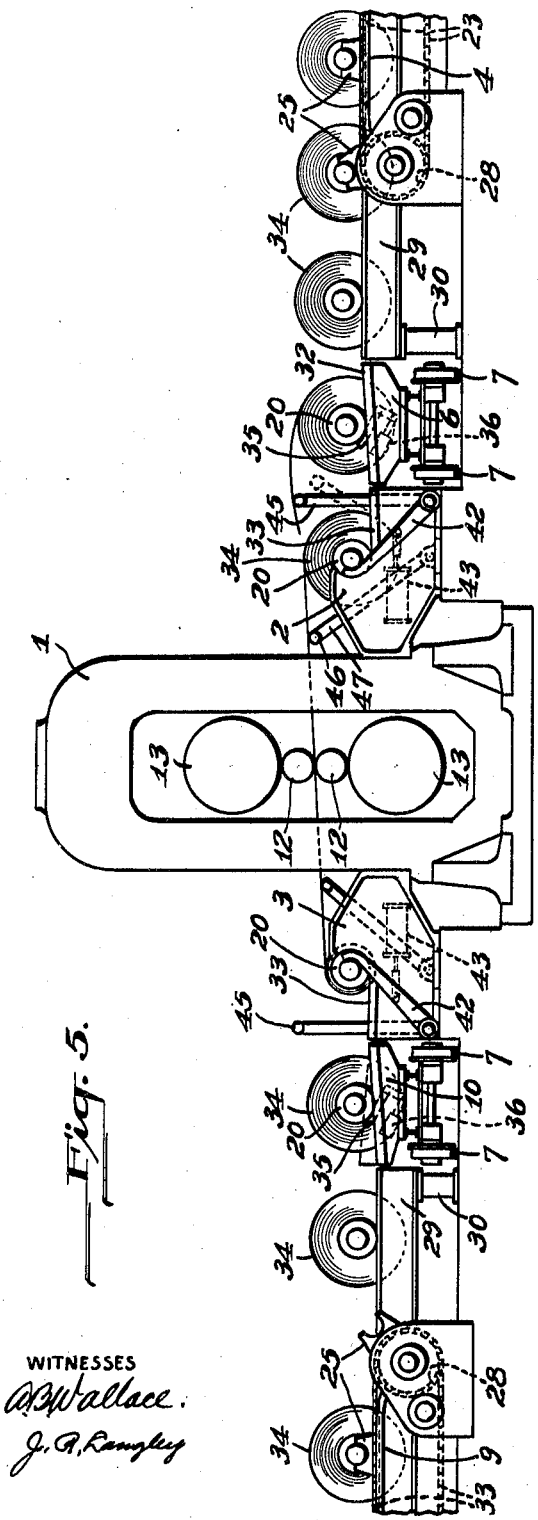
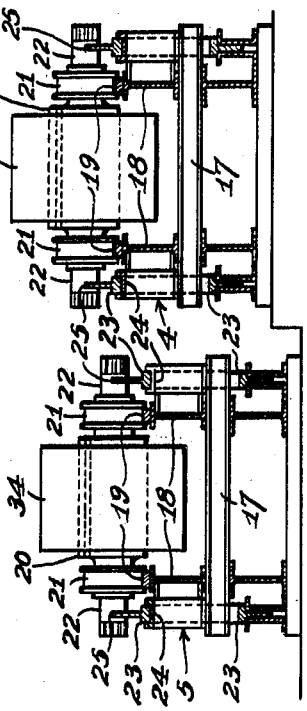
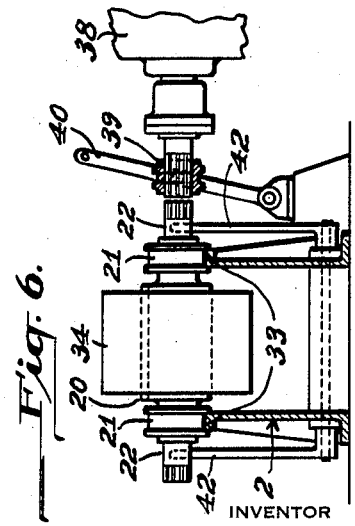

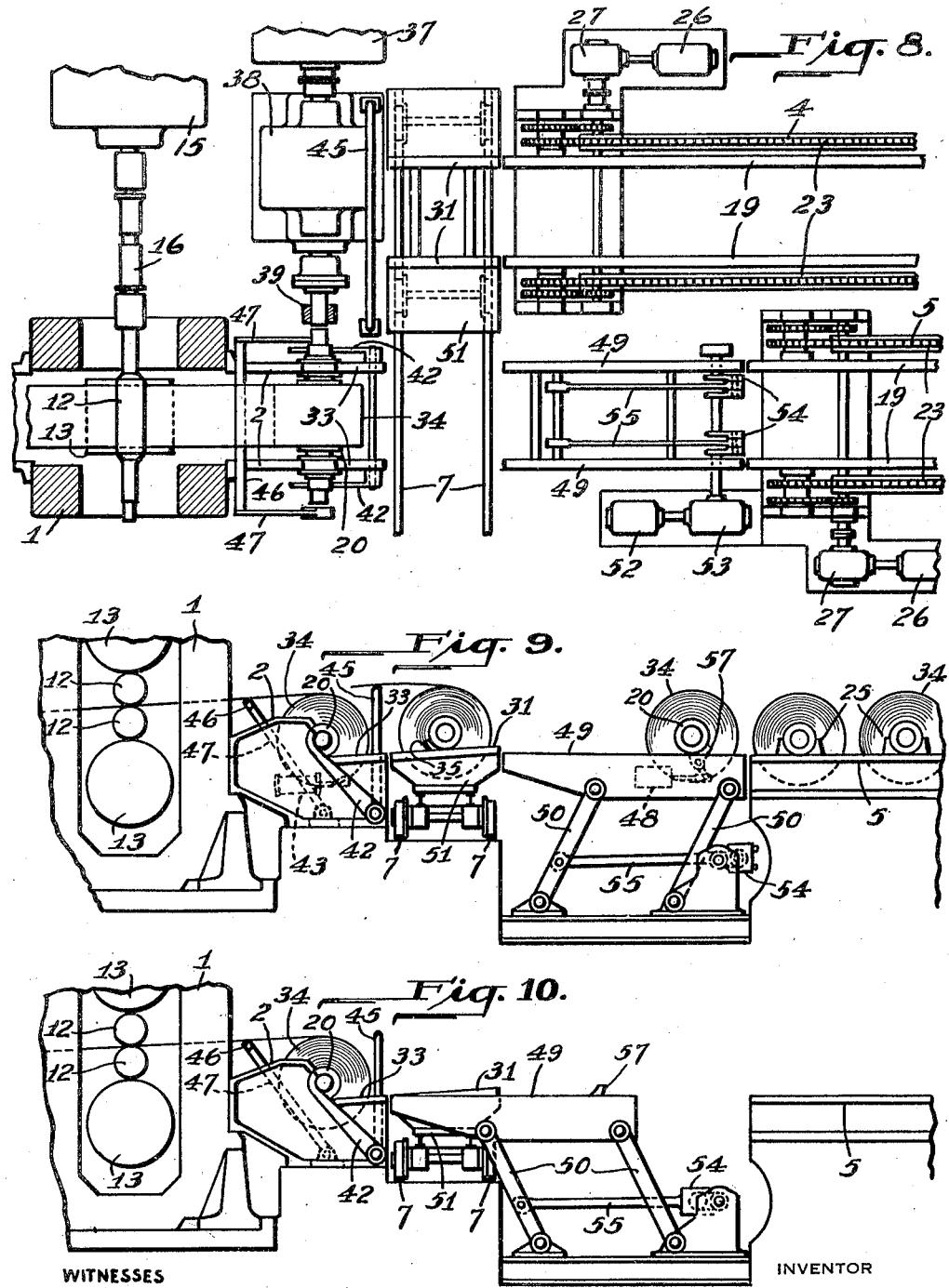

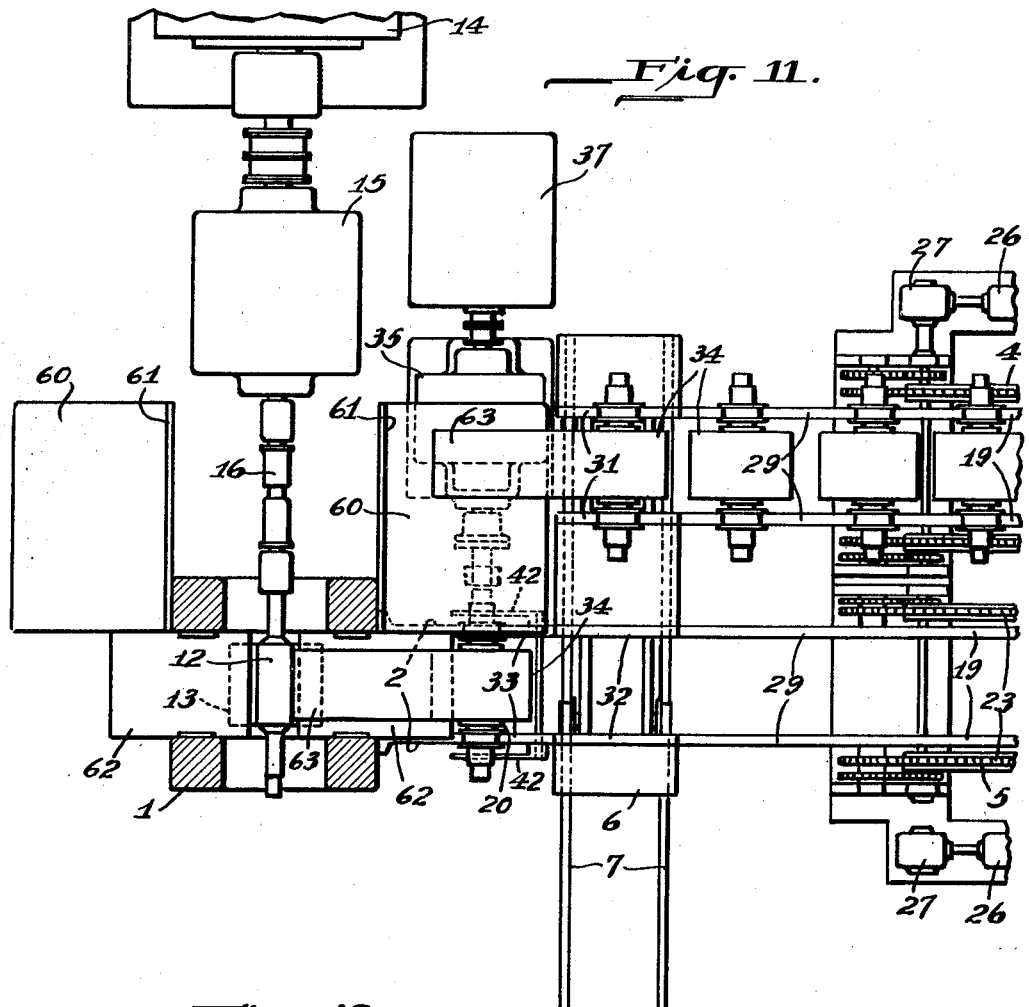
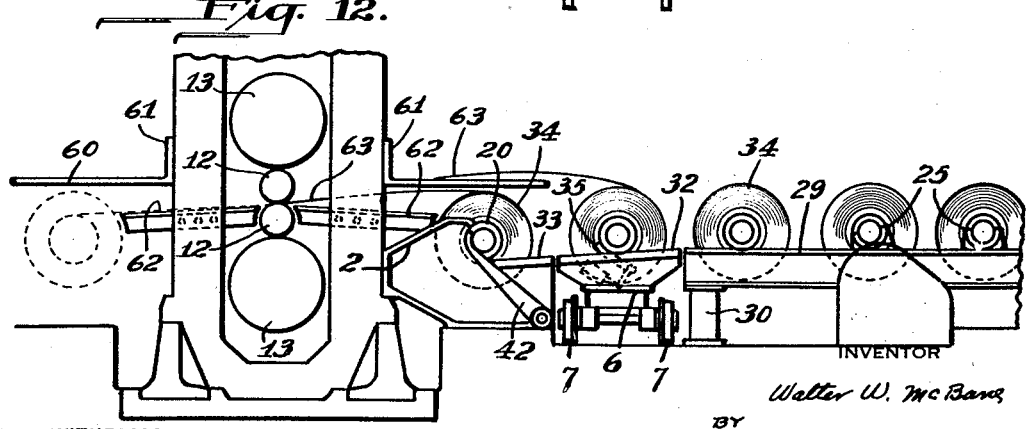

Patented Nov. 3, 1936

2,059,703

UNITED STATES PATENT OFFICE 2,059,703

COIL HANDLING APPARATUS

Walter W. McBane, Pittsburgh, Pa., assignor to United Engineering & Foundry Company, Pittsburgh, Pa., a corporation of Pennsylvania Application February 9, 1933, Serial No. 655,877

11 Claims. (Cl. 80—32)

My invention relates to rolling mills, and particularly to coil-handling apparatus for supplying material to and removing it from mills for rolling metal strip.

In the operation of mills for rolling metal strip, it is desirable that the coils of metal in strip form be supplied to the mill and the empty drums for such coils be removed therefrom as expeditiously as possible in order that the operation of the mill may be substantially continuous and the cost of rolling the strip be maintained at a minimum. It is also desirable that material to be rolled shall be introduced into the mill and separated therefrom with minimum delay in order that the entire process may be expedited.

In accordance with the present invention I provide a system of conveyors on each side of the rolling mill for conveying coils or empty coil drums and for removing coils or empty drums, as the case may be, in a substantially continuous unidirectional path, whereby the transfer of the metal to the mill and of the completed coils or empty drums therefrom may occur with relatively little delay between the successive operations. A transfer car which operates transversely of each pair of conveyors conveys coils or empty drums from one of the conveyors into alignment with the other conveyor or with the rolling mill, whereby coils or drums from an incoming conveyor may be in readiness for substitution for the previously completed coil or drum that has been emptied.

The conveying system referred to above is flexible in its operation for the reason that the strip to be rolled may be passed through the mill any desired number of times, and empty drums or coils may be supplied to either side of the mill and removed therefrom, depending upon the number of passes being odd or even. In other words, the coils of rolled strip may be removed with equal facility from either side of the mill, according as the number of passes are odd or even.

The details of my invention will be described in connection with the accompanying drawings, in which Fig. 1 is a plan view of a mill for rolling strip and associated apparatus; Fig. 2 is a view, partially in front elevation and partially in longitudinal section on line II—II, of the apparatus of Fig. 1; Fig. 3 is an enlarged plan view of a portion of the apparatus of Fig. 1; Fig. 4 is a longitudinal sectional view of a bearing sleeve for a coil drum; Fig. 5 is an enlarged view in front elevation of a portion of the apparatus of Fig. 2; Fig. 6 is an enlarged detail view of a coil box and apparatus for rotating coil drums; Fig. 7 is an enlarged view in transverse vertical section taken on line VII—VII of Fig. 1; Fig. 8 is a plan view of a portion of modified apparatus; Figs. 9 and 10 are views in front elevation of the apparatus of Fig. 8, parts being broken away; Fig. 11 is a plan view of a further modification; and Fig. 12 is a front elevation of the apparatus of Fig. 11.

Referring particularly to Figs. 1 to 7, a strip mill constructed and arranged in accordance with my invention comprises a rolling mill 1 having on the respective sides thereof and in alignment therewith coil boxes 2 and 3. A conveyor system for the coil box 2 comprises two parallel conveyors 4 and 5 that are of relatively different heights, the conveyor 4 being at a higher level than the conveyor 5.

A transfer car 6 which is of sufficient length to extend across both conveyors 4 and 5 operates on rails 7 that extend transversely of the conveyors. The coil box 3 is similarly associated with conveyors 8 and 9 and a similar transfer car 10 that operates transversely of the conveyors. The conveyor 8 is disposed at a higher level than the conveyor 9. Each of the transfer cars 6 and 10 is provided with an electric motor 11 for operating it. While they are shown as single cars, they may of course be replaced by two coupled cars.

The mill 1, which is preferably of the 4-high type, is provided with two working rolls 12 and two backing rolls 13. The working rolls 12 are driven by means of a motor 14 that is connected thereto through reduction gear mechanism 15 and suitable universal couplings 16.

Referring particularly to Fig. 7, each conveyor comprises structural framework 17 comprising horizontal beams 18 upon the upper surface of which are mounted rails 19 for supporting coil drums 20 which may either be empty or employed for delivering metal strip to the mill or conveying it therefrom.

As shown in Figs. 6 and 7, each drum 20 is provided adjacent the ends thereof with collars or sleeves 21 that are connected to the trunnions 22 by means of suitable anti-friction bearings such, for example, as the ball bearings 22a, Fig. 4. The collars are adapted to roll upon the rails 19 without rotation of the drums or coils thereon.

At the sides of the beams 18 and parallel thereto endless chains 23 are mounted for operation on tracks 24. Each of the chains 23 is provided with a series of spaced notched members 25 for receiving the trunnions 22 of the coil drums. The chains of each conveyor are driven by means of a motor 26 that is connected to the chains through a reduction gear mechanism 27 and suitable sprocket wheels 28.

At the inner ends of the conveyors on either side of the mill are projecting end portions 29 of the beams 18 having rails thereon that are in extension of the rails 19 of the conveyors. A post 30 supports each projecting portion 29. The tables bridge the gaps between the several conveyors and the transfer cars for receiving drums therefrom, or for supplying drums thereto. Each of the pairs of projections or extensions 29 provides a convenient storage space for a drum with or without a coil thereon while a coil or a drum is being supplied to the adjacent coil box. This temporary storage renders it unnecessary to operate the corresponding outgoing conveyor until a transfer has been completed.

A transfer car 6 is provided with two pairs of transverse rails 31 and 32 that are arranged at different inclinations in order that the outer ends of these rails may register respectively with the rails 19 of the conveyors 4 and 5, while the inner ends of both pairs are arranged at a common level to register with the rails 33 of the coil box 2. By means of this arrangement, when the transfer car 6 is in its normal position with the rails 31 and 32 in alignment with the respective conveyors 4 and 5, a coil 34 may be transferred from the conveyor 4 to the transfer car 6 and a drum may be transferred from the coil box 2 across the car 6 to the rails 19 of the extensions 29 for subsequent transfer to the chain 23 of conveyor 5. The transfer car 10 is similarly provided with rails 31 and 32.

The operation of the apparatus referred to above will now be described on the assumption that coils 34 of strip metal to be rolled are being supplied by the conveyor 4 and that the metal makes an odd number of passes through the mill 1. The conveyor 4 will be supplied with coils 34 that are actuated by the respective pairs of notched members 25 and are closely adjacent to each other, as shown in Figs. 2 and 4. The first coil is removed from the end of the chain of conveyor 4 across extensions 29 in alignment therewith and onto the rails 31 of the transfer car 6, the coil being retained in the position in which it is illustrated in Figs. 2 and 5 by means of latches 35, one of which is shown in Fig. 5, and which are controlled by a fluid pressure cylinder 36.

The transfer car 6 is then operated forwardly until the rails 31 thereon are in alignment with the coil box 2. The latches 35 are then released, whereupon the coil 34 may roll from the rails 31 and over rails 33 of the coil box 2 into the position in which a coil 34 is shown in Fig. 5. The transfer car 6 is then returned to its initial or normal position.

As best shown in Figs. 1, 3 and 6, an electric motor 37 adjacent each coil box is adapted to be connected through reduction gear mechanism 38 and a manually operable clutch mechanism 39 controlled by a lever 40 to the adjacent trunnion 22 of the drum 20. The end of the strip which may ordinarily be released while the coil is on the transfer car 6 in alignment with the conveyor 4 is then threaded through the mill 1 and is connected to an empty drum 20 with which the coil box 3 has been previously provided. The metal is then rolled alternately in opposite directions through the mill 1 until the desired dimensions or gauge have been obtained. During this rolling operation the motor 37 connected to the drum for receiving the rolled metal strip acts as a driving motor while the other motor 37 acts as a generator to provide dynamic braking and thus keep the strip taut in each direction of travel.

Since the metal makes an odd number of passes through the mill, the completed coil 34 will be in the coil box 3 and the drum 20 in the coil box 2 is empty. The latter will be removed from the coil box 2 by means of hooked arms 42 which engage the trunnions 22, the arms being actuated by means of a fluid pressure cylinder 43.

The empty drum 20 is then rolled across the rails 32 of the transfer car 6 to extensions 29 in alignment therewith in readiness to be transferred to the conveyor 5. A second coil 34 which has in the meantime been transferred from the conveyor 4 to the opposite end of the transfer car 6 is then transferred to the coil box 2 in the manner previously described in connection with the first coil. While the metal of the second coil is being rolled, the first empty drum 20 is placed on the conveyor 5 and the latter will be actuated to remove this drum to a sufficient distance that a succeeding drum may be supplied to the conveyor.

On the opposite side of the mill empty drums 20 are being supplied by means of the conveyor 8 and the transfer car 10 to the coil box 3, and completed coils are being removed from the coil box 3 across the transfer car 10 for removal by the conveyor 9 to any suitable location for storage or removal, as desired. It will be understood that the operation of transferring empty drums to the coil box 3 and removal of completed coils therefrom corresponds in all essential respects to the supplying of complete coils by the conveyor 4 and the removal of empty drums from the coil box 2 by the conveyor 5.

During the operation of the mill with an odd number of passes empty drums are being conveyed therefrom by the conveyor 5 and are supplied thereto on the opposite side by the conveyor 8. Accordingly, it is necessary to provide some suitable transfer mechanism for conveying the empty drums from the conveyor 5 to the conveyor 8 for use on the opposite side of the mill. Such transfer mechanism may be of any desired type and constitutes no part of the present invention.

In case the mill is operated with an even number of passes for the metal passing therethrough, the operations are similar to those described above, except that coils of metal to be rolled will be supplied to the coil box 2 and complete coils of finished metal will be removed therefrom and conveyed by the conveyor 5 for disposal in any suitable manner. On the other side of the mill it is only necessary that the coil box 3 be provided with an empty drum for receiving metal being rolled and returning it to the mill, the metal making its final passage to the coil box 2.

In order to assist in handling the loose end of strip metal when a coil is received on a transfer car from an incoming conveyor, I provide a stationary horizontal bar or rail 45 extending parallel and adjacent to the inner side of each transfer car. The loose end of the strip is supported on this rail and slides thereon as the transfer car moves forward to place the coil in alignment with the coil box and the mill.

A movable horizontal roller 46 is supported by pivoted arms 47 and extends across the coil box to receive and support the loose end of the strip after the latter passes from the stationary bar 45. The roller 46 and arms 47 occupy the position indicated by dotted lines in Fig. 5 while the coil is on the car. When the coil is moved from the car to the coil box the roller 46 moves over the coil box into the position indicated by the full lines in Fig. 5. The end of the strip is then supported in position to be fed into the mill 1 by any suitable or usual means, such for example, as the usual "sticker."

When the drum is removed from the coil box, the roller 46 is moved to its dotted line position in readiness for the succeeding operation.

Reference may now be had to Figs. 8, 9, and 10, in which is illustrated a modified form of apparatus, similar reference numerals being employed to designate parts corresponding to those of the preferred embodiment of my invention. Inasmuch as the operation of the modified apparatus is in general similar to that previously described, it has not been necessary to illustrate a complete system.

At the end of the conveyor 5 there is provided a transfer table 49 which operates on parallel pivoted supports 50 between the inner end of a conveyor 5 and the coil box 2. This arrangement enables the employment of a transfer car 51 that employs a single pair of rails 31 for receiving coils or drums from the conveyor 4 which in this arrangement extends adjacent the car 51, extensions 29 being omitted.

In the operation of this form of my invention a coil 34 may be transferred from the conveyor 4 to the transfer car 51 since the rails 31 of the latter are arranged to register therewith. When the transfer table 49 is in its right-hand position as shown in Fig. 9, there is sufficient clearance for the transfer car 51 to move along the rails 7 therefor into alignment with the coil box 2. When the coil 34 has been transferred to the latter, the car 51 is returned to the position in which it is shown in Fig. 8 and the transfer table 49 may be actuated to the position shown in Fig. 10 in readiness to receive the coil of rolled metal or an empty drum, according as the mill is operating with an even or an odd number of passes.

When a coil or drum is received from the coil box 2 by the table 49, it is operated by means of a motor 52 and suitable gear mechanism 53 connected to crank arms 54 and links 55 that rock the supports 50, to the position shown in Fig. 9, whereupon transfer may be effected to the conveyor 5.

The operation of a similar mechanism upon the opposite side of the mill may be readily understood since the corresponding parts will be arranged symmetrically with those shown in Figs. 8, 9 and 10.

It will be noted that the top of the table 49 is inclined downward toward the conveyor 5. A stop 57 for retaining coils or drums on the table during transfer is controlled by a fluid pressure motor 48.

The operation of the modified form of apparatus, except as to the transfer table and certain associated apparatus described above, is similar to that of the preferred form of my invention. The modified apparatus may be used to convey coils or drums to the mill 1 or to remove them therefrom with tne same degree of flexibility with respect to the employment of an even or an odd number of passes through the mill.

In the apparatus of Figs. 11 and 12, I have substituted for each of the horizontal bars 45 of Figs. 1, 2, 3, and 5 a horizontal table or plate 60 having a vertical stop 61 for limiting the travel of the end of the strip in unwinding of the coil. The stop 61 may be either an integral upturned edge of the plate 60 or it may be separate and adjustable laterally of the plate, as desired.

Also in this latter modification, I substitute for each of the pivotally mounted rollers 46 an apron 62 that is secured to the housing of the mill 1 and receives and supports the loose end of the coil when it slides off the plate 60 as the coil moves into alignment with the coil box 2. The apron 62 serves also as a guide for the end of the strip when the coil is moved into the coil box.

In the use of the apparatus of Figs. 11 and 12 the loose end 63 of the coil is preferably of such length on the plate 60 that when it is transferred to the apron 62 and the coil is moved into the coil box 2, the end will be moved into a "sticker" or other suitable mechanism in proper position to be fed into the rolls of the mill 1.

The plate 60 provides a suitable and convenient support upon which the end of the coil may be flattened or straightened in readiness to be inserted into the mill. Also the entire end portion may be supported and there is no danger of any overhanging portion engaging any of the adjacent apparatus during the movements of the coil while being transferred. For these reasons, the plate may, in many cases, be preferable to the relatively narrow bar 45.

The advantages of a strip mill constructed and arranged in accordance with either of the forms of my invention are that coils of metal to be rolled may be conveyed to a point closely adjacent to the mill in readiness for a succeeding operation and may be prepared for introduction of the loose end of the strip into the mill prior to the placing of the coil in the coil box therefor.

While the direction of the conveyors and the conveying of coils or empty drums may be reversed, if desired, it has been found desirable in the interest of economy of time to arrange them for operation in the directions and for the purposes set forth above because of the saving in time with respect to the preparation of a coil for introduction into the mill. The symmetrical arrangement of the various operating parts enables the mill to be operated in any desired manner.

The foregoing and other advantages will be apparent to those skilled in the art of the construction and operation of mills and coil-handling apparatus of the character of that of my invention.

I claim:

1. A strip mill comprising a fixed coil box, two conveyors one of which is in alignment with said coil box, and transfer means for shifting devices into and out of alignment with said conveyors at the ends thereof adjacent said coil box and for operatively connecting said coil box and the conveyor in alignment therewith.

2. A strip mill comprising a coil box, a supplying conveyor and a receiving conveyor, and a transfer car for shifting devices between said coil box and one of said conveyors and for constituting a bridge between said coil box and the other conveyor.

3. A strip mill comprising a coil box, a supplying conveyor, a receiving conveyor and a transfer car for shifting devices between said coil box and the supplying conveyor and for serving as a bridge to support devices moving from said coil box to the receiving conveyor.

4. A strip mill comprising a coil box, a supplying conveyor and a receiving conveyor, the receiving conveyor being in alignment with said coil box but spaced therefrom, a transfer car operable between the coil box and the receiving conveyor to shift devices from the supplying conveyor to said coil box, and means for shifting devices from said coil box and across the space for said transfer car directly to said receiving conveyor.

5. A strip mill comprising a coil drum-supporting receptacle, two parallel conveyors having different levels and adapted for conveying coil drums toward and away from said receptacle, and a transfer car having two pairs of tracks thereon for respectively registering at one end thereof with the conveyors, each of said pairs of tracks registering at the other end with said receptacle, thereby permitting drums to be transferred between either of said conveyors and said receptacle.

6. A strip mill comprising two parallel conveyors having different levels, a receptacle for receiving coil drums supplied by the conveyor of higher level, and a transfer car having a plurality of supporting means thereon that are so inclined as to register at one of the ends of each of them with said receptacle and the other ends are at respectively different levels for registering with the ends of said conveyors, thereby permitting movement of said drums between both of said conveyors and said car on one side of the latter and between said car and said receptacle on the other side of the car.

7. A strip mill comprising a roll-stand, a coil box in alignment therewith, a conveyor out of alignment with said coil box for carrying coils of strip material to be mounted in said coil box for delivery to said roll-stand, means for transferring said coils laterally of said conveyor into alignment with said coil box for transfer to the latter, and means operable during the transfer of said coils to support the outer ends of said strip material in case the ends have been loosened prior to such transfer.

8. A strip mill comprising a roll-stand, a coil box in alignment therewith, a conveyor out of alignment with said coil box for carrying coils of strip material to be mounted in said coil box for delivery to said roll-stand, means for transferring said coils laterally of said conveyor into alignment with said coil box for transfer thereto, and means comprising a horizontal bar for supporting loose outer ends of said coils during the transfer of the latter.

9. A strip mill comprising a roll-stand, a coil box in alignment therewith, a conveyor out of alignment with said coil box for carrying coils of strip material to be mounted in said coil box for delivery to said roll-stand, means for transferring said coils laterally of said conveyor into alignment with said coil box for transfer thereto, means comprising a stationary horizontal member for supporting the loose end of a coil while being transferred laterally of said conveyors, and a member movable with said loose end for supporting it during the transfer of said coil to said coil box and during the movement of said end into said roll-stand.

10. A strip mill comprising a roll stand, means for axially shifting coils of metal strip into position for entrance into the roll pass of said stand, means in front of said stand for guiding the strip from the coils into the roll pass thereof, and a horizontally disposed guide arranged at the side of said stand for supporting and guiding the free end of a coil onto said entrance guide when it is being shifted into position to be fed into the stand.

11. A strip mill comprising a roll stand, a coil box disposed in front of said stand, means for guiding the free end of a coil from said coil box into the roll pass of said stand, means adjacent said stand for axially delivering a coil to said coil box, a horizontally disposed support for supporting and guiding onto said first-mentioned guiding means an end stripped form a coil when it is being shifted into position for delivery into said coil box, and a vertically disposed guide for at the same time guiding the extremity of the stripped coil end past the front of the roll stand.

WALTER W. McBANE.